United States Patent [19]

Vandemoere

[11] Patent Number: 4,801,957
[45] Date of Patent: Jan. 31, 1989

[54] DISPOSABLE SINGLE-USE CAMERA AND ACCESSORY RE-USABLE ELECTRONIC FLASH UNIT

[75] Inventor: Alan V. Vandemoere, Rochester, N.Y.

[73] Assignee: Eastman Kodak Company, Rochester, N.Y.

[21] Appl. No.: 157,239

[22] Filed: Feb. 18, 1988

[51] Int. Cl.⁴ .............................................. G03B 15/03
[52] U.S. Cl. ................................. 354/147; 354/145.1; 354/288
[58] Field of Search ..................... 354/126, 129, 145.1, 354/147, 288

[56] References Cited

U.S. PATENT DOCUMENTS

| | | | |
|---|---|---|---|
| 3,577,899 | 5/1971 | Ikegami | 354/126 |
| 4,106,077 | 8/1978 | Furda | 354/126 |
| 4,666,274 | 5/1987 | Maeno et al. | 354/288 |
| 4,751,536 | 6/1988 | Ohmura et al. | 354/288 |
| 4,758,852 | 7/1988 | Maejima | 354/288 |

Primary Examiner—A. A. Mathews
Attorney, Agent, or Firm—Roger A. Fields

[57] ABSTRACT

A disposable single-use camera is generally of the type wherein an inner camera part is pre-loaded with film and includes a taking lens, and an outer sealed pack contains the camera part and has an opening for the taking lens. According to the invention, the inner camera part has flash synchronization access ports and the outer sealed pack is constructed of a perforable material which overlays the access ports. An accessory re-usable electronic flash unit intended for use with the disposable camera includes electrically conductive flash synchronization pins shaped to perforate the outer sealed pack to enter the access ports, whereby the flash unit is removably connected to the inner camera part.

9 Claims, 4 Drawing Sheets

DISPOSABLE SINGLE-USE CAMERA AND ACCESSORY RE-USABLE ELECTRONIC FLASH UNIT

BACKGROUND OF THE INVENTION

1. Field of the Invention

The invention relates generally to the field of photography, and more particularly to a disposable single-use camera and an accessory re-usable electronic flash unit intended for use with the disposable camera.

2. Description of the Prior Art

Recently, a disposable single-use 35 mm camera referred to as the "Quick Snap" was introduced by Fuji Photo Film Co. Ltd., and another disposable single-use 35 mm camera referred to as the "Fling 35" was introduced by Eastman Kodak Co. Generally, each disposable camera is a point-and-shoot type and comprises (1) a plastic inner camera part including a taking lens, a film metering mechanism, and a shutter and (2) a cardboard outer sealed pack which contains the inner camera part and has respective openings for the taking lens and for a shutter release button, a frame counter window, a film advance thumbwheel, and a simple see-through viewfinder of the camera part. At the manufacturer, the inner camera part is loaded with a conventional 24-exposure 35 mm film cartridge, and substantially the entire length of the unexposed filmstrip is factory prewound from the cartridge into a supply chamber of the camera part. After the customer takes a picture, the thumbwheel is manually rotated to rewind the exposed frame into the cartridge. The rewinding movement of the filmstrip the equivalent of one frame rotates a metering sprocket to decrement a frame counter to its next lower numbered setting. When substantially the entire length of the filmstrip is exposed and rewound into the cartridge, the single-use camera is sent to a photofinisher who first removes the inner camera part from the cardboard sealed pack and then removes the filmstrip from the camera part. The filmstrip is processed, and the camera part and the opened pack are thrown away.

While neither of these disposable cameras is adapted for use with an electronic flash unit, Fuji Photo Film Co. Ltd. has now made available a disposable camera having a built-in electronic flash unit. Both the camera part and the built-in flash unit are contained within the sealed pack. When the disposable camera is sent to the photofinisher, the same must be done to the built-in flash unit. The disadvantage is that this arrangement significantly increases the selling price of the camera assembly.

SUMMARY OF THE INVENTION

The above described problem associated with known disposable single-use cameras is believed solved by the invention. The invention provides a disposable single-use camera and an accessory re-usable electronic flash unit. Owing to the novel design of these two components, only the disposable camera need be returned to the photofinisher; the flash unit is retained by the customer for re-use with another disposable camera.

According to the invention, there is provided an improved combination of a disposable single-use camera and an electronic flash unit, wherein (a) an inner camera part is pre-loaded with film and includes a taking lens and a shutter and (b) an outer sealed pack contains said camera part and has an opening for said taking lens, and wherein the improvement comprises:

said inner camera part has flash synchronization access ports;

said outer sealed pack is constructed of a perforable material which overlays said access ports; and said flash unit includes electrically conductive flash synchronization pins shaped to perforate said outer sealed pack to enter said access ports, whereby the flash unit is removably connected to said inner camera part.

DETAILED DESCRIPTION OF THE PREFERRED EMBODIMENT

The invention is disclosed in connection with a 35 mm camera and an electronic flash unit. Because such a camera and flash unit are widely known, this description is directed in particular to photographic elements forming part of or cooperating directly with the invention. It is to be understood, however, that other elements not specifically shown or described may take various forms known to persons of ordinary still in the art.

Figure 1:
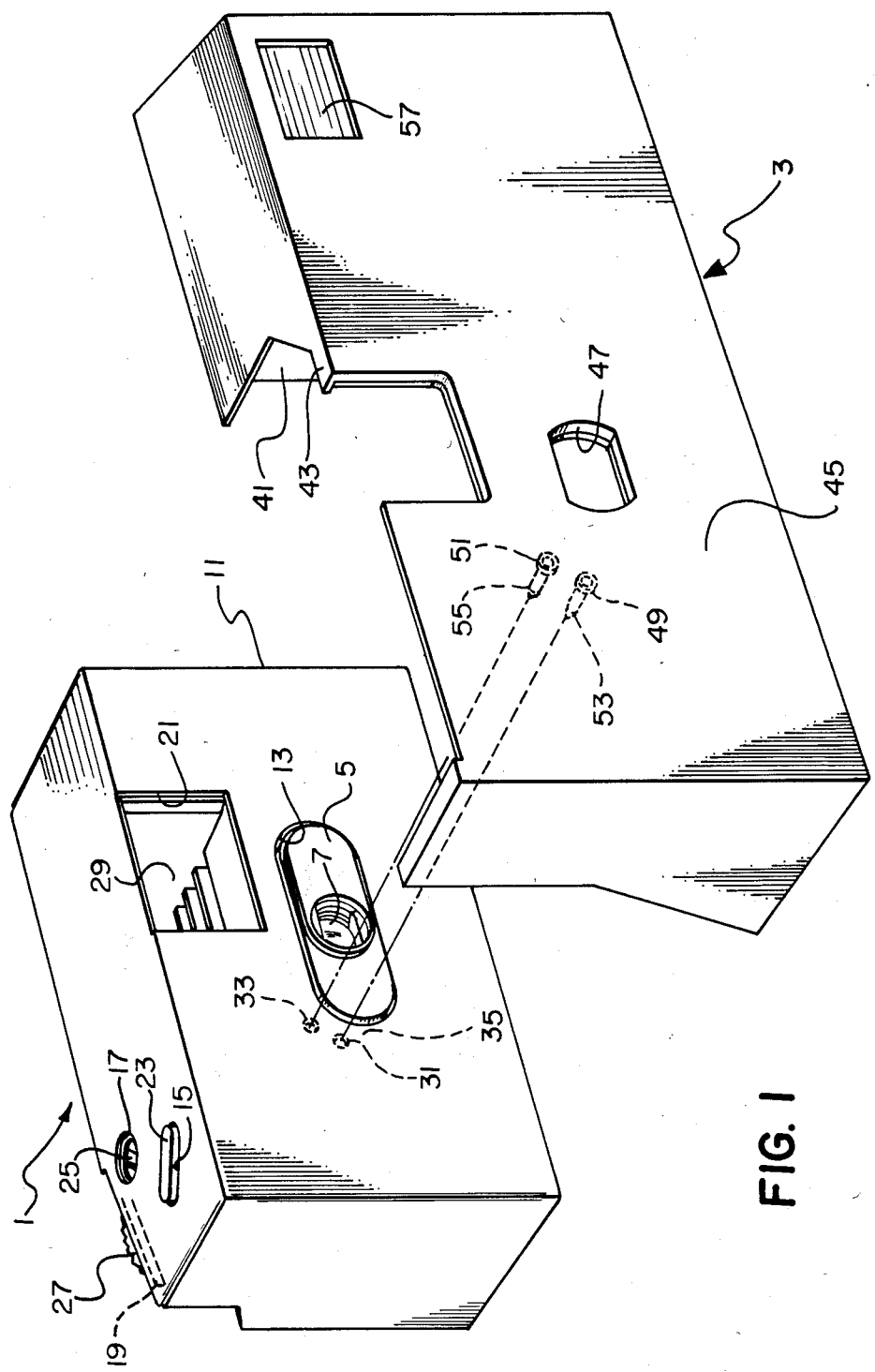
FIG. 1 is a front perspective view of a disposable single-use camera and an accessory re-usable electronic flash unit, according to a preferred embodiment of the invention.
Figure 2:
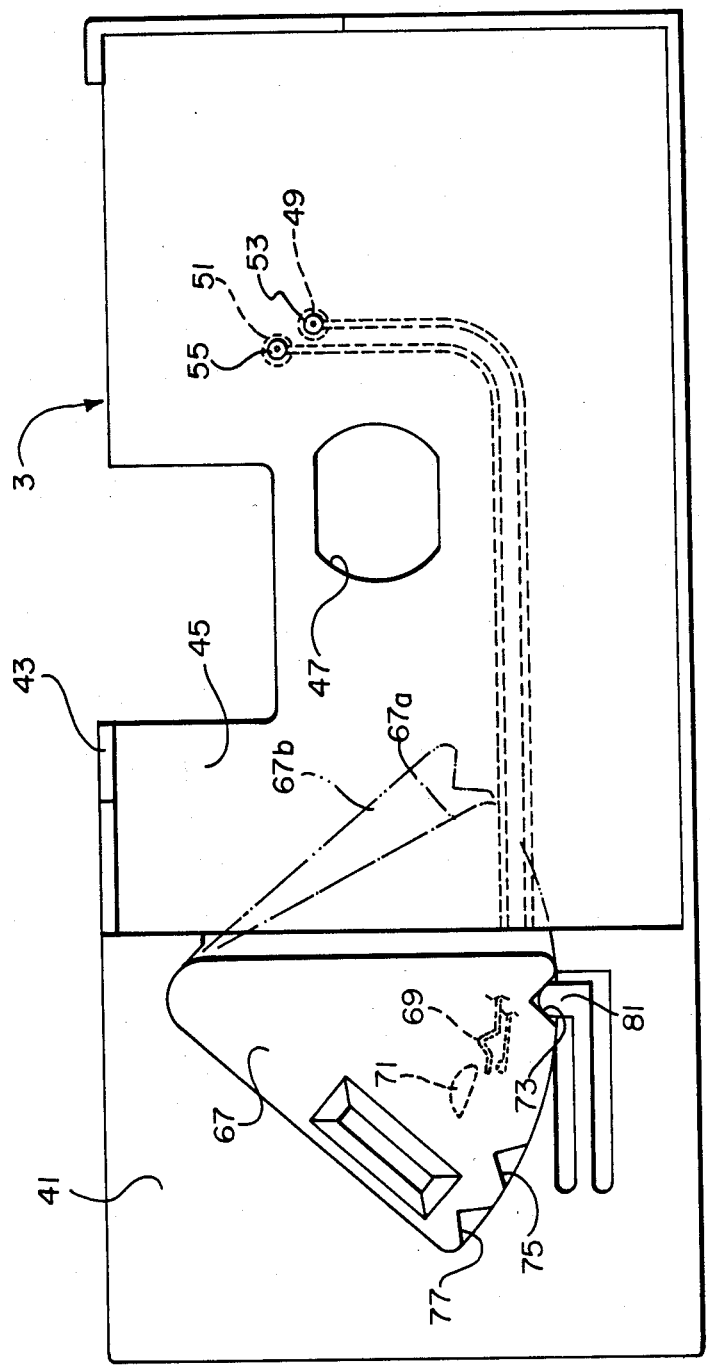
FIG. 2 is a rear elevation view of the flash unit.

Referring now to the drawings, FIG. 1 depicts a disposable single-use 35 mm camera 1 and an accessory re-usable electronic flash unit 3. As shown in FIGS. 1 and 2, the disposable camera 1 is a point-and-shoot type and comprises (1) an inner camera part 5 includes a taking lens 7, a film metering mechanism (not shown), and a single blade shutter 9 and (2) an outer sealed pack 11 which contains the inner camera part and has respective openings 13, 15, 17, 19, and 21 for the taking lens, a shutter release button 23, a frame counter window 25, a film advance thumbwheel 27, and a direct see-through viewfinder 29. The release button 23, the counter window 25, the thumbwheel 27, and the viewfinder 29, like the taking lens 7, are located on the inner camera part 5. The outer sealed pack 11 is decorative in nature and is constructed of a paper-like material, such as cardboard. The inner camera part 5 is constructed of plastic.

At the manufacturer, the inner camera part 5 is loaded with a conventional 24-exposure 35 mm film cartridge and substantially the entire length of the unexposed filmstrip is factory prewound from the cartridge onto a take-up spool (not shown) of the camera part. After the customer takes a picture by depressing the release button 23, the thumbwheel 27 is manually rotated to rewind the exposed frame into the cartridge. The rewinding movement of the filmstrip the equivalent of one frame rotates a metering sprocket (not shown) to decrement a frame counter (not shown) to its next lower numbered setting. When substantially the entire length of the filmstrip is exposed and rewound into the cartridge, the single-use camera 1 is sent to a photofinisher who first removes the inner camera part 5 from the cardboard sealed pack 11 and then removes the filmstrip from the camera part. The filmstrip is processed, and the camera part and the opened pack are thrown away.

Figure 3:
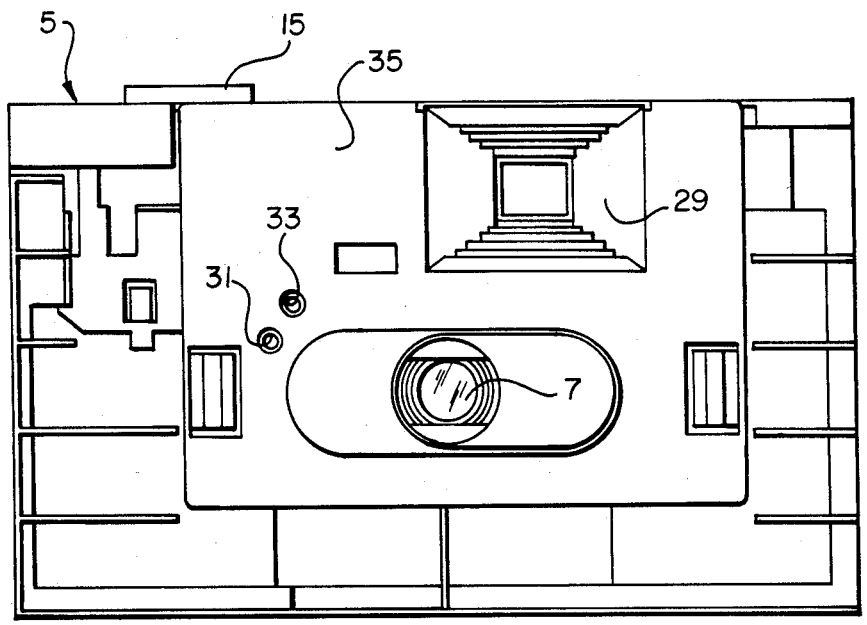
FIG. 3 is a front elevation view of a inner camera part of the single-use camera, showing a front face of the camera part and a taking lens.
Figure 4:
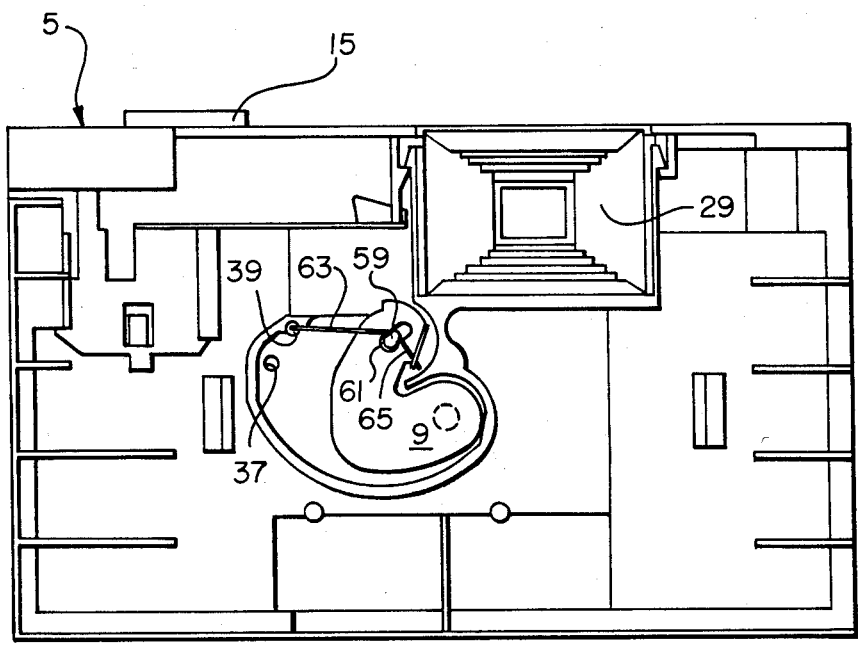
FIG. 4 is a front elevation view of the inner camera part, showing a portion of its front face and the taking lens removed to illustrate a closed shutter.

As shown in FIG. 3, the inner camera part 5 has a pair of flash synchronization access ports or openings 31 and 33 which extend through a front face 35 of the camera part at a location proximate the taking lens 7. The respective access ports 31 and 33 are aligned with corresponding recesses 37 and 39 which, as can be seen in FIG. 4, are located proximate the single blade shutter 9. Normally, the two access ports 31 and 33 are covered by the outer sealed pack 11. See FIG. 1.

The re-usable flash unit 3, in addition to having a conventional flash emission device 41, includes an integral shell-like portion 43 which is dimensioned to fit over the single-use camera 1 in the manner shown in FIG. 1. A front wall 45 of the shell-like portion 43 has an opening 47 for the taking lens 7. Respective supports 49 and 51 for a pair of electrically conductive flash synchronization pins 53 and 55 are located on the inside of the front wall 45. The two conductive pins 53 and 55 have pointed tips to enable then to readily perforate the outer sealed pack 11. When the shell-like portion 43 is fit over the single-use camera 1 as shown in FIG. 1, a flash window 57 of the flash emission device 41 is positioned in proper relation with the taking lens 7 for a flash exposure and the two conductive pins 53 and 55 are driven or forced through the outer sealed pack 11, directly into the respective access ports 31 and 33. The two conductive pins 53 and 55 then bottom out in the respective recesses 37 and 39. See FIG. 4.

Figure 5:
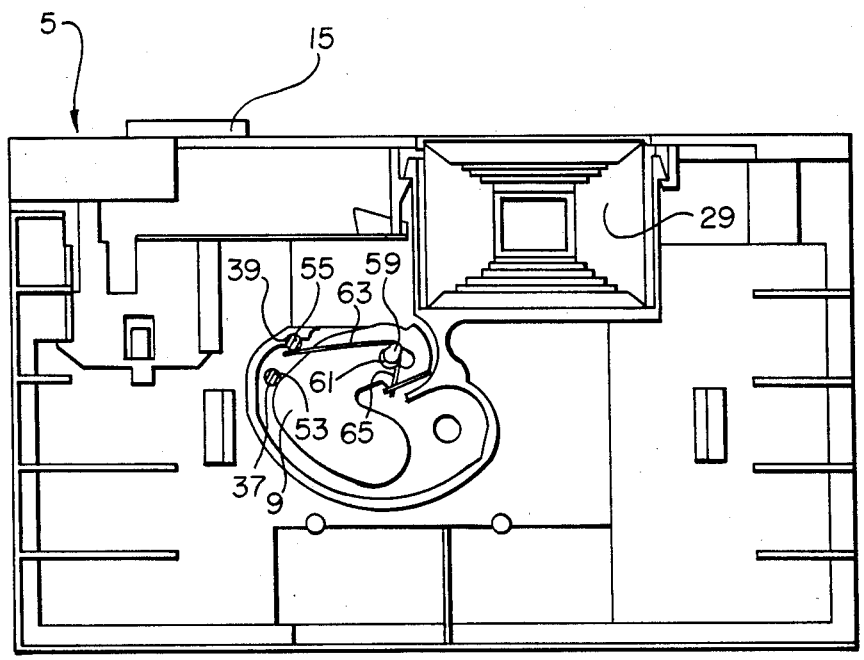
FIG. 5 is a front elevation view similar to FIG. 4, illustrating the shutter fully opened.

The shutter blade 9 is electrically conductive and is mounted for pivotable movement about a fixed pin 59, against the urging of an electrically conductive return spring 61, from a closed position shown in FIG. 4 to a fully opened position shown in FIG. 5. The access port 33 and its corresponding recess 39 are arranged to position the conductive pin 55 in continuous contact with one leg 63 of the return spring 61. Another leg 65 of the return spring 61 is connected to the shutter blade 9. The access port 31 and its corresponding recess 37 are arranged to position the conductive pin 53 in contact with the shutter blade 9 only when the shutter blade is fully opened. When the two conductive pins 53 and 55 enter the access ports 31 and 33 and bottom out in the corresponding recesses 37 and 39, and the shutter blade 9 is then fully opened, a conventional flash synchronization or trigger circuit (not shown) is completed between the shutter blade and the flash emission device 41.

As shown in FIG. 2, at the back of the flash emission device 41, there is provided a pivotally mounted locking/switching member 67 which, when swung from its illustrated position to an intermediate broken line position 67a, partially covers the rear of the single-use camera 1 to secure the shell-like portion 43 to the single-use camera, and which, when swung from the intermediate broken line position to a final broken line position 67b, closes a conventional normally opened flash energizing switch 69 to ready the flash emission device 41 for firing when the shutter blade 9 is fully opened. The locking/switching member 67 includes a cam element 71 for closing the flash energizing switch 69 and has three v-shaped cut-outs 73, 75, and 77 respectively engageable with a spring-urged arresting element 81 to releasably secure the locking/switching member 67 in its three positions.

Operation

When the shell-like portion 43 is fit over the single-use camera 1 as shown in FIG. 1, the flash window 57 is positioned in proper relation with the taking lens 7 for a flash exposure and the two conductive pins 53 and 55 are driven through the outer sealed pack 11, directly into the respective access ports 31 and 33. The two conductive pins 53 and 55 then bottom out in the respective recesses 37 and 39. See FIG. 4.

To secure the shell-like portion 43 to the single-use camera 1, the locking/switching member 67 is swung from its illustrated position in FIG. 2 to the intermediate broken line position 67a in that FIG. Should flash photography rather than daylight photography be desired, the locking/switching member 67 is swung from its intermediate broken line position 67a in FIG. 2 to the final broken line position 67b in that FIG. to close the flash energizing switch 69. Then, when the shutter blade 9 is fully opened, the flash emission device 41 is automatically fired. Since the flash output reaches its peak almost immediately, i.e. there is no firing delay, the maximum brilliance of the flash light coincides with full opening of the shutter blade 9. Should daylight photography rather than flash photography be desired, the locking/switching member 67 is left in its intermediate broken line position 67a. Then, when the shutter blade 9 is fully opened, the flash emission device 41 is not fired.

The invention has been described with reference to a preferred embodiment. However, it will be appreciated that variations and modifications can be effected within the ordinary skill in the art without departing from the scope of the invention. For example, instead of using the shell-like portion 43 to position the two conductive pins 53 and 55 to enter the respective access ports 31 and 33, two indicators (not shown) can be imprinted on the outer sealed pack 11 to shown where the conductive pins should perforate the sealed pack.

I claim:

1. An improved combination of a disposable single-use camera and an electronic flash unit, wherein (a) an inner camera part is pre-loaded with film and includes a taking lens and a shutter and (b) an outer sealed pack contains said camera part and has an opening for said taking lens, and wherein the improvement comprises:
    said inner camera part has flash synchronization access ports;
    said outer sealed pack is constructed of a perforable material which overlays said access ports; and
    said flash unit includes electrically conductive flash synchronization pins shaped to perforate said outer sealed pack to enter said access ports, whereby the flash unit is removably connected to said inner camera part.

2. The improvement as recited in claim 1, wherein said flash unit has integral means for positioning it relative to said outer sealed pack to locate the flash unit in proper relation with said taking lens for a flash exposure and to drive said conductive pins through the sealed pack into said access ports.

3. The improvement as recited in claim 2, wherein said integral means includes a shell-like member for partially covering said outer sealed pack, said shell-like member having an opening for said taking lens and respective supports for said conductive pins.

4. The improvement as recited in claim 2, wherein said shutter is electrically conductive and is mounted for movement to fully open, an electrically conductive return spring is connected to said shutter, one of said access ports is arranged to position a conductive pin in that port in continuous contact with said return spring, and another port is arranged to position a conductive pin in that port in contact with said shutter only when the shutter is fully opened.

5. An accessory re-usable electronic flash unit intended for use with a disposable single-use camera comprising an (a) inner camera part pre-loaded with film and including a taking lens, a shutter, and flash synchronization access ports and (b) an outer sealed perforable pack containing said camera part and having an opening for said taking lens, wherein said flash unit comprises:
   electrically conductive flash synchronization pins shaped to perforate said outer sealed pack to enter said access ports, whereby said flash unit is removably connected to said inner camera part.

6. An electronic flash unit as recited in claim 5, further comprising:
   integral means for positioning said flash unit relative to said outer sealed pack to locate the flash unit in proper relation with said taking lens for a flash exposure and to drive said conductive pins through the sealed pack into said access ports.

7. An electronic flash unit as recited in claim 6, wherein said integral means includes a shell-like member for partially covering said outer sealed pack, said shell-like member having an opening for said taking lens and respective supports for said conductive pins.

8. An improved disposable single-use camera intended for use with an accessory re-usable electronic flash unit including electrically conductive flash synchronization pins, wherein said disposable camera comprises (a) an inner camera part pre-loaded with film and including a taking lens and a shutter and (b) an outer sealed pack containing said camera part and having an opening for said taking lens, and wherein the improvement comprises:
   said outer sealed pack is constructed of a perforable material which can be perforated by said conductive pins; and
   said inner camera part has flash synchronization access ports arranged directly behind said outer sealed pack to immediately receive said conductive pins when the pins perforate the sealed pack.

9. The improvement as recited in claim 8, wherein said shutter is electrically conductive and is mounted for movement to fully open, an electrically conductive return spring is connected to said shutter, one of said access ports is arranged to position a conductive pin in that port in a continuous contact with said return spring, and another port is arranged to position a conductive pin in that port in contact with said shutter only when the shutter is fully opened.

* * * * *